(12) United States Patent
Spinoulas et al.

(10) Patent No.: US 10,275,644 B2
(45) Date of Patent: Apr. 30, 2019

(54) AUTOMATIC CLASSIFICATION OF EARDRUM SHAPE

(71) Applicants: Leonidas Spinoulas, San Jose, CA (US); Sofia Karygianni, Lausanne (CH); Manuel Martinello, Mountain View, CA (US); Pascal Frossard, La Tour-de-Trême (CH); Ivana Tosic, San Francisco, CA (US)

(72) Inventors: Leonidas Spinoulas, San Jose, CA (US); Sofia Karygianni, Lausanne (CH); Manuel Martinello, Mountain View, CA (US); Pascal Frossard, La Tour-de-Trême (CH); Ivana Tosic, San Francisco, CA (US)

(73) Assignee: RICOH COMPANY, LTD, Tokyo (JP)

( * ) Notice: Subject to any disclaimer, the term of this patent is extended or adjusted under 35 U.S.C. 154(b) by 0 days.

(21) Appl. No.: 15/453,394

(22) Filed: Mar. 8, 2017

(65) Prior Publication Data
US 2018/0260616 A1 Sep. 13, 2018

(51) Int. Cl.
*G06K 9/00* (2006.01)
*G06K 9/46* (2006.01)

(52) U.S. Cl.
CPC ........... *G06K 9/00288* (2013.01); *G06K 9/00* (2013.01); *G06K 9/00268* (2013.01); *G06K 9/4642* (2013.01); *G06K 2209/05* (2013.01)

(58) Field of Classification Search
CPC ........... G06K 9/00288; G06K 9/00268; G06K 9/4642
See application file for complete search history.

(56) References Cited

U.S. PATENT DOCUMENTS 6,110,106 A 8/2000 MacKinnon et al.
6,483,535 B1 11/2002 Tamburrino et al.
(Continued)

FOREIGN PATENT DOCUMENTS

CN 1531410 A 9/2004
CN 101305899 A 11/2008
(Continued)

OTHER PUBLICATIONS

Kuruvilla et al, "Automated Diagnosis of Otitis Media: Vocabulary and Grammar", Intl. J. of Biomedical Imaging, 2013.*
(Continued)

*Primary Examiner* — Ruiping Li
(74) *Attorney, Agent, or Firm* — Fenwick & West LLP

(57) ABSTRACT

Eardrums are automatically classified based on a feature set from a three-dimensional image of the eardrum, such as might be derived from a plenoptic image captured by a light field otoscope. In one aspect, a grid is overlaid onto the three-dimensional image of the eardrum. The grid partitions the three-dimensional image into cells. One or more descriptors are calculated for each of the cells, and the feature set includes the calculated descriptors. Examples of descriptors include various quantities relating to the depth and/or curvature of the eardrum. In another aspect, isocontour lines (of constant depth) are calculated for the three-dimensional image of the eardrum. One or more descriptors are calculated for the isocontour lines, and the feature set includes the calculated descriptors. Examples of descriptors include various quantities characterizing the isocontour lines.

20 Claims, 4 Drawing Sheets
(2 of 4 Drawing Sheet(s) Filed in Color)

(56) References Cited

U.S. PATENT DOCUMENTS

| | | | |
|---|---|---|---|
| 7,058,441 | B2 | 6/2006 | Sharar et al. |
| 7,399,375 | B2 | 7/2008 | Leiser et al. |
| 7,433,042 | B1 | 10/2008 | Cavanaugh et al. |
| 7,448,753 | B1 | 11/2008 | Chinnock |
| 7,544,163 | B2 | 6/2009 | MacKinnon et al. |
| 7,723,662 | B2 | 5/2010 | Levoy et al. |
| 7,901,351 | B2 | 3/2011 | Prescott |
| 7,936,392 | B2 | 5/2011 | Ng et al. |
| 7,995,214 | B2 | 8/2011 | Forster et al. |
| 8,066,634 | B2 | 11/2011 | Andreassen et al. |
| 8,100,826 | B2 | 1/2012 | Mackinnon et al. |
| 8,107,086 | B2 | 1/2012 | Hart et al. |
| 8,143,565 | B2 | 3/2012 | Berkner et al. |
| 8,617,061 | B2 | 12/2013 | Magalhaes Mendes et al. |
| 8,824,779 | B1 | 9/2014 | Smyth |
| 8,944,596 | B2 | 2/2015 | Wood et al. |
| 8,949,078 | B2 | 2/2015 | Berkner et al. |
| 9,001,326 | B2 | 4/2015 | Goldfain |
| 9,392,933 | B2 | 7/2016 | Bedard et al. |
| 9,565,996 | B2 | 2/2017 | Berkner et al. |
| 2004/0147810 | A1 | 7/2004 | Mizuno |
| 2005/0228231 | A1 | 10/2005 | MacKinnon et al. |
| 2005/0283065 | A1 | 12/2005 | Babayoff |
| 2008/0259274 | A1 | 10/2008 | Chinnock |
| 2010/0004513 | A1 | 1/2010 | Mackinnon et al. |
| 2011/0026037 | A1 | 2/2011 | Forster et al. |
| 2011/0152621 | A1 | 6/2011 | Magalhaes Mendes et al. |
| 2012/0065473 | A1 | 3/2012 | Andreassen et al. |
| 2012/0182438 | A1 | 7/2012 | Berkner et al. |
| 2012/0226480 | A1 | 9/2012 | Berkner et al. |
| 2012/0320340 | A1 | 12/2012 | Coleman, III |
| 2012/0327426 | A1 | 12/2012 | Hart et al. |
| 2012/0327427 | A1 | 12/2012 | Hart et al. |
| 2013/0002426 | A1 | 1/2013 | Hart et al. |
| 2013/0002824 | A1 | 1/2013 | Hart et al. |
| 2013/0003078 | A1 | 1/2013 | Hart et al. |
| 2013/0027516 | A1 | 1/2013 | Hart et al. |
| 2013/0128223 | A1 | 5/2013 | Wood et al. |
| 2013/0237754 | A1 | 9/2013 | Berglund et al. |
| 2013/0289353 | A1 | 10/2013 | Seth et al. |
| 2014/0012141 | A1 | 1/2014 | Kim et al. |
| 2014/0192255 | A1 | 7/2014 | Shroff et al. |
| 2014/0316238 | A1 | 10/2014 | Berkner et al. |
| 2014/0350379 | A1 | 11/2014 | Verdooner |
| 2015/0005640 | A1 | 1/2015 | Davis et al. |
| 2015/0005644 | A1 | 1/2015 | Rhoads |
| 2015/0065803 | A1* | 3/2015 | Douglas ............. A61B 1/00009 600/200 |
| 2015/0116526 | A1 | 4/2015 | Meng et al. |
| 2015/0117756 | A1 | 4/2015 | Tosic et al. |
| 2015/0126810 | A1 | 5/2015 | Wood et al. |

FOREIGN PATENT DOCUMENTS

| | | |
|---|---|---|
| CN | 102105780 A | 6/2011 |
| CN | 102265124 A | 11/2011 |
| JP | 2001-157664 A | 6/2001 |
| JP | 2002-34916 A | 2/2002 |
| WO | WO 2012/058641 A2 | 5/2012 |
| WO | WO 2013/138081 A1 | 9/2013 |
| WO | WO 2014/021994 A1 | 2/2014 |

OTHER PUBLICATIONS

Shie et al, "A Hybrid Feature-Based Segmentation and Classification System for the Computer Aided Self-Diagnosis of Otitis Media", IEEE, 2014.*
Bedard, N. et al., "Light Field Otoscope," in Imaging and Applied Optics 2014, OSA Technical Digest (online) (Optical Society of America, 2014), paper IM3C.6.
Bedard, N. et al., In Vivo Middle Ear Imaging with a Light Field Otoscope. In Optics in the Life Sciences, OSA Technical Digest (Optical Society of America, 2015), paper BW3A.3, 2014.
Berkner et al, "Measuring Color and Shape Characteristics of Objects from Light Fields." Imaging and Applied Optics, 2015, 3 pages.
Chinese Office Action, Chinese Application No. 201410010071.X, dated May 6, 2015, 7 pages (with concise explanation of relevance).
Cho, N.H. et al., "Optical Coherence Tomography for the Diagnosis of Human Otitis Media," Proc. SPIE, 2013, 5 pages, vol. 8879, 88790N.
Hernandez-Montes, M.S. et al., "Optoelectronic Holographic Otoscope for Measurement of Nanodisplacements in Tympanic Membranes," Journal of Biomedical Optics, Proceedins of the XIth International Congress and Exposition, Society for Experimental Mechanics Inc., Jun. 2-5, 2008, 7 pages, vol. 14, No. 3.
Kim, C. et al., "Scene Reconstruction from High Spatio-Angular Resolution Light Fields," Transactions on Graphics (TOG), 2013, 11 pages, vol. 32, No. 4.
Kubota A. et al.,"View Interpolation using Defocused Multi-View Images," Proceedings of APSIPA Annual Summit and Conference, Asia-Pacific Signal and Information Processing Association, 2009 Annual Summit and Conference, Saporo, Japan, Oct. 4, 2009, pp. 358-362.
Kuruvilla, A. et al., "Otitis Media Vocabulary and Grammar," CMU, ICIP, 2012, 4 pages.
Levoy, M. "Light Field and Computational Imaging," IEEE Computer Magazine, 2006, pp. 46-55, vol. 39.
Levoy, M. et al., "Light Field Microscopy," Proc. SIGGRAPH, ACM Transactions on Graphics, 2006, pp. 1-11, vol. 25, No. 3.
Myburgh, H.C. et al., "Otitis Media Diagnosis for Developing Countries Using Tympanic Membrane Image-Analysis," EBioMedicine, 2016, pp. 156 160, vol. 5.
Ng, R. et al., "Light Field Photography with a Hand-Held Plenoptic Camera," Stanford Tech Report, 2005, pp. 1-11.
Sundberg, M., et al., "Fibre Optic Array for Curvature Assessment—Application in Otitis Media," Medical & Biological Engineering & Computing, Mar. 2004, pp. 245-252, vol. 42, No. 2.
Sundberg, M., et al., "Diffuse Reflectance Spectroscopy of the Human Tympanic Membrane in Otitis Media," Physiological Measurement, 2004, pp. 1473-193, vol. 25, No. 6.
Tao, M. et al., "Depth from Combining Defocus and Correspondence Using Light-Field Cameras," in Proceedings of the International Conference on Computer Vision, 2013, 8 pages.
Wanner, S. et al., "Globally Consistent Depth Labeling of 4D Light Fields," in Proceedings of the IEEE Computer Society Conference on Computer Vision and Pattern Recognition, 2012, pp. 41-48.
Yang, T. et al., "High Performance Imaging Through Occlusion via Energy Minimization-Based Optimal Camera Selection," International Journal of Advanced Robotic Systems, 2013, pp. 19, vol. 10.
U.S. Appl. No. 14/312,586, filed Jun. 23, 2014, Inventors: Lingfei Meng et al.
U.S. Appl. No. 15/452,613, filed Mar. 7, 2017, Inventors: Sofia Karygianni et al.
U.S. Appl. No. 13/896,924, filed Jul. 8, 2015, 15 pages.
U.S. Appl. No. 14/318,578, filed Dec. 10, 2015, 13 pages.
Extended European Search Report, European Patent Application No. 18157050.8, dated Aug. 1, 2018, 7 pages.
Bedard et al., "Light field otoscope design for 3D in vivo imaging of the middle ear," *Biomedical Optics Express*, vol. 8, No. 1, Dec. 14, 2016, p. 260.
Funnell, W. R. J., "Image processing applied to the interactive analysis of interferometric fringes," *Applied Optics*, vol. 20, No. 18, Sep. 15, 1981, p. 3245-3250.
Suryanarayan et al., "Dynamic Hand Pose Recognition Using Depth Data," 2010 20th International Conference on Pattern Recognition, Aug. 23, 2010, pp. 3105-3105.

* cited by examiner

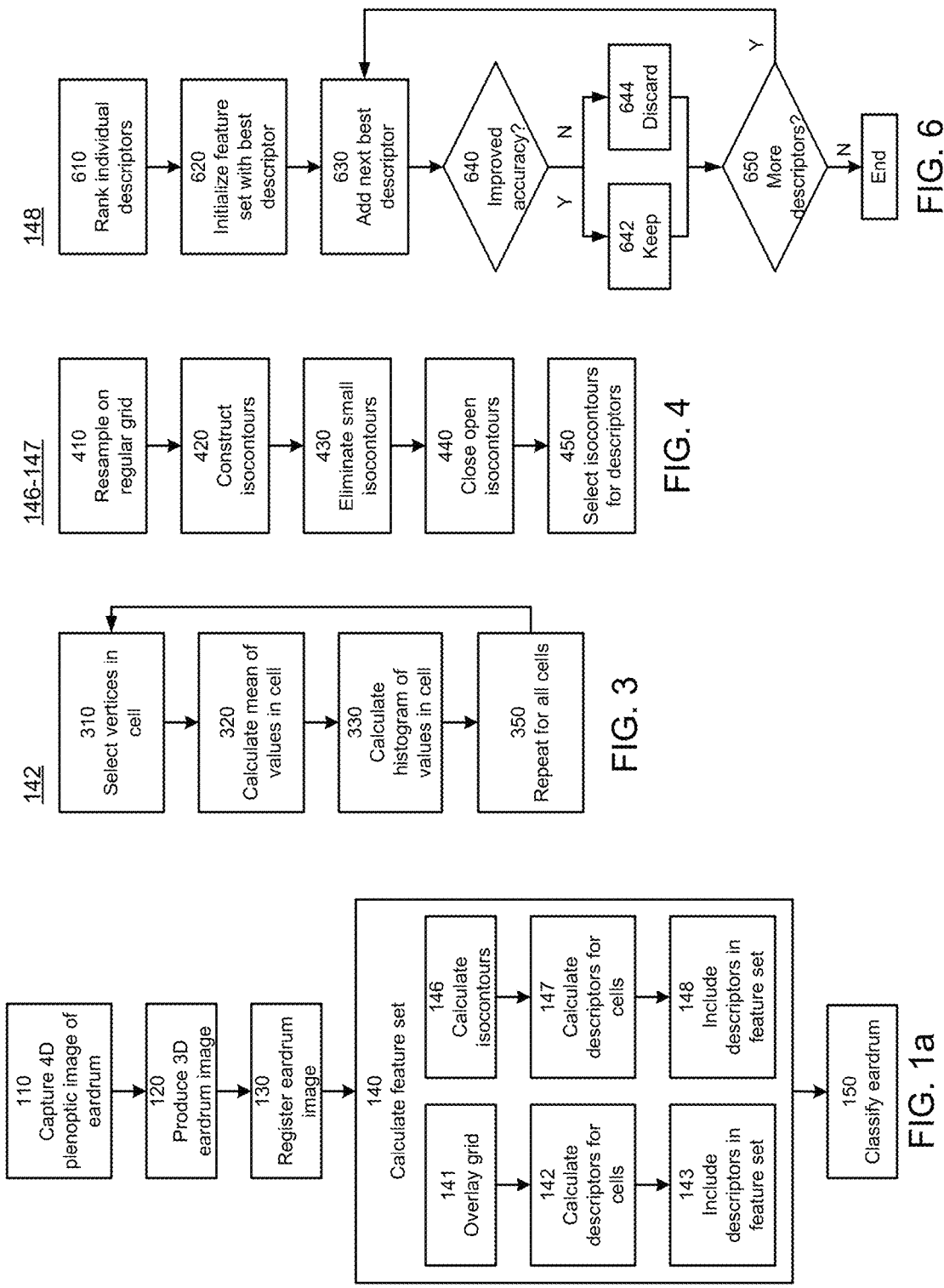

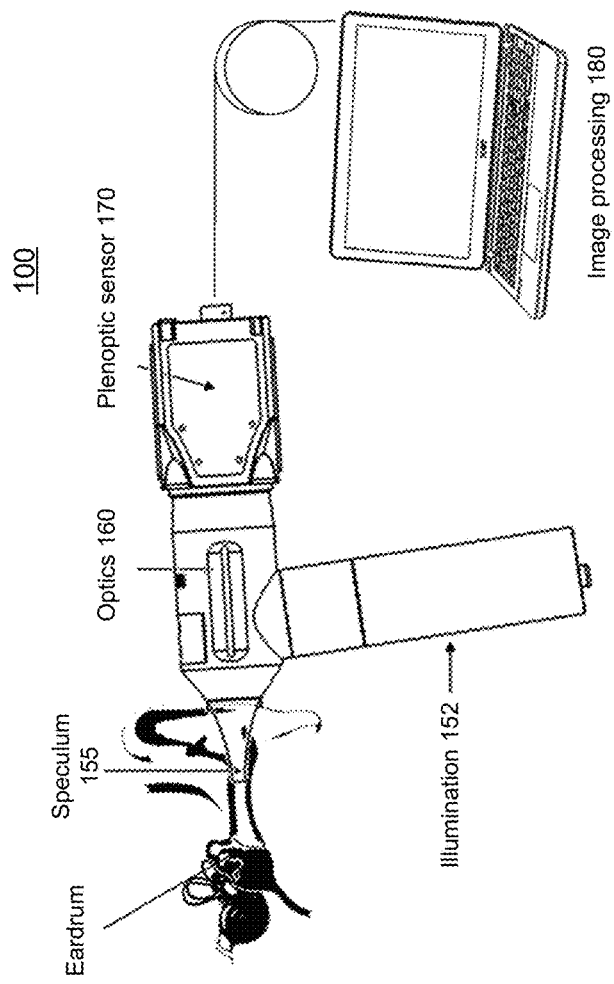
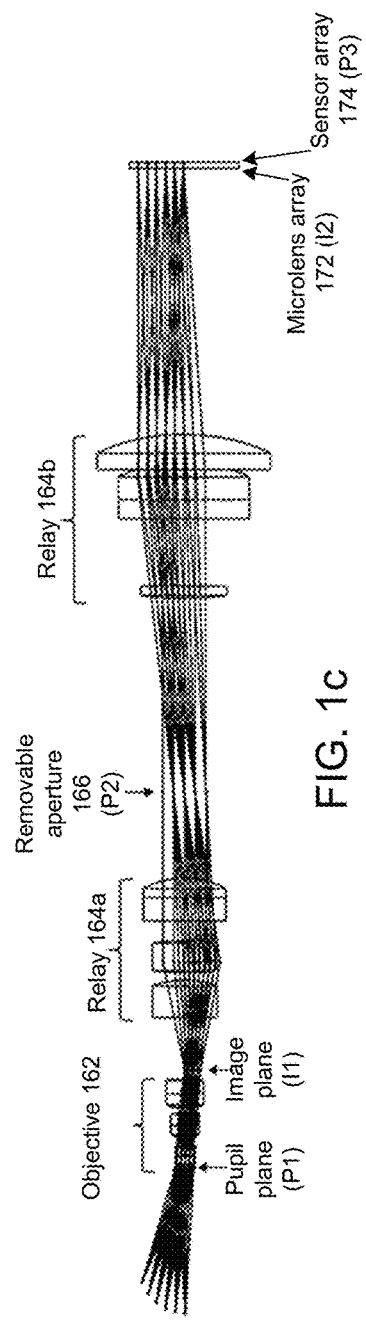
FIG. 1b
FIG. 1c

AUTOMATIC CLASSIFICATION OF EARDRUM SHAPE

BACKGROUND

1. Field of the Invention

This disclosure relates generally to analysis of three-dimensional images of the eardrum, including those produced from light field images.

2. Description of Related Art

Past studies have shown that the three-dimensional (3D) shape of the eardrum (also called the tympanic membrane or TM) is one of the most important factors for distinguishing Acute Otitis Media (AOM) which is a bacterial infection of the middle ear and requires antimicrobial treatment, from Otitis Media with Effusion (OME) which is a sterile effusion and tends to resolve on its own, and from No Effusion (NOE) which is a normal ear drum condition. In clinical assessment of otitis media conditions, clinicians typically visually inspect the TM using traditional otoscopes and decide whether the TM is bulging, retracting or it is in its neutral shape. Bulging of the TM is due to the presence of fluid in the middle ear behind the TM, which pushes the TM forward from its neutral position. When the TM is retracted, it is pulled back from its neutral position. Such assessment of the TM shape is very important towards accurate diagnosis.

Therefore, an algorithm that can automatically and accurately assess the three-dimensional (3D) shape of the eardrum could lead to more accurate and more widespread diagnoses. However, most prior work tries to provide automatic classification of otitis media conditions from two-dimensional images obtained with conventional digital otoscopes. They may try to infer shape properties from two-dimensional images—from shading or image gradients—which can be erroneous and depend heavily on prior data.

Thus, there is a need for better approaches to automatically classify the shape of eardrums.

SUMMARY

The present disclosure overcomes the limitations of the prior art by automatically classifying eardrums based on a feature set from a three-dimensional image of the eardrum, such as might be derived from a plenoptic image captured by a light field otoscope. In one aspect, a grid is overlaid onto the three-dimensional image of the eardrum. The grid partitions the three-dimensional image into cells. One or more descriptors are calculated for each of the cells, and the descriptors are used as part of a feature set for classification. Examples of descriptors include various quantities relating to the depth and/or curvature of the eardrum.

In another aspect, isocontour lines of constant depth are calculated for the three-dimensional image of the eardrum. One or more descriptors are calculated for the isocontour lines, and these are used as part of a feature set for classification. Examples of descriptors include various quantities characterizing the isocontour lines.

Other aspects include components, devices, systems, improvements, methods, processes, applications, computer readable mediums, and other technologies related to any of the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure have other advantages and features which will be more readily apparent from the following detailed description and the appended claims, when taken in conjunction with the accompanying drawings, in which:

FIG. 1a is a flow diagram for automatic eardrum classification using a light field otoscope (LFO), according to various embodiments.

FIG. 1b is a diagram of a LFO suitable for use in capturing a plenoptic image of the eardrum, according to the method of FIG. 1a. FIG. 1c is a diagram of an optical train for the LFO of FIG. 1b.

FIG. 3 is a flow diagram for calculating descriptors for a grid-based approach to classification, according to one embodiment.

FIG. 4 is a flow diagram for calculating isocontours for use in an isocontour-based approach to classification, according to one embodiment.

FIG. 6 is a flow diagram for selecting isocontour-based descriptors, according to one embodiment.

Figure 2C:
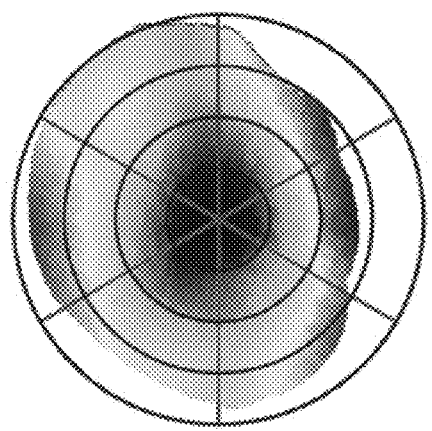
FIGS. 2a-2c illustrate the use of an elliptical grid ($G_E$), a circular grid with unregistered center ($G_{C1}$), and a circular grid with registered center ($G_{C2}$), respectively, in a grid-based approach for feature extraction, according to various embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FIG. 1a is a flow diagram for automatic eardrum classification using a light field otoscope (LFO), according to various embodiments. In this example, a LFO captures 110 a plenoptic image containing four-dimensional (4D) light field data of the ear canal, including the eardrum. The 4D light field data is processed 120 to produce a three-dimensional (3D) image of the eardrum. This 3D image may have variations in tilt, position and scale, due to variations in the otoscope position and variations in the eardrums of different patients. In step 130, the 3D image of the eardrum is registered (i.e., normalized) as defined in a standard form. The registered 3D image is used to calculate 140 a feature set, which is used to classify 150 the three-dimensional eardrum shape, for example to distinguish AOM, OME and NOE. FIG. 1a shows two approaches to calculating 140 features, which will be discussed in further detail below.

FIG. 1b is a diagram of a LFO suitable for use in capturing 110 a 4D light field image of the eardrum. FIG. 1c is a diagram of an example optical train for the LFO of FIG. 1b. In this example, the otoscope 100 is handheld and includes a main body and a handle. The main body houses the optics 160 and the plenoptic sensor 170. The handle includes illumination 152 for the otoscope 100. Referring to FIG. 1c, the optics 160 includes an otoscope objective 162 and relay optics 164a-b. The plenoptic sensor 170 is a sensor array 174 with a microimaging array 172 (e.g., a microlens array or pinhole array) mounted in front of it. A disposable speculum 155 is attachable to the tip of the otoscope. In this example, the output of the plenoptic sensor 170 is transmitted to a separate computer system 180, which processes the captured light field data and displays the desired results. For example, the computer system 180 may implement the automatic feature extraction and eardrum classification process described in FIG. 1a.

The imaging optics 160 form a conventional image within the otoscope instrument at an intermediate image plane I2. Rather than a conventional sensor array capturing this image, a plenoptic sensor 170 captures the image. The microlens array 172 is positioned at the intermediate image plane I2 and a sensor array 174 is positioned at a conjugate P3 of the pupil plane P1. In addition, a filter module (not shown in FIG. 1) can be inserted at a pupil plane of the optical train (or at one of its conjugates) to allow spectral or other filtering of the light. The 4D light field data captured by the plenoptic sensor 170 is sent to a computing module 180 that performs the image processing of the plenoptic data. In this way, three-dimensional (3D) shapes, translucency and/or color information can be captured and extracted.

In the example design of FIG. 1c, the first relay lens group 164a is used to re-image and magnify the pupil P1. An aperture stop 166 (with removable aperture) is placed at the re-imaged pupil plane P2. The second relay lens group 164b forms an image of the object onto the microlens array 172 at I2, which is a conjugate of image plane I1. The relay lens group 164b is positioned one focal length from the aperture stop location P2 and one focal length from the image plane I2, such that rays are image-space telecentric.

Other examples are described in U.S. application Ser. No. 13/896,924 "Plenoptic Otoscope," Ser. No. 15/063,362 "Optical Design of a Light Field Otoscope," and Ser. No. 14/323,949 "Otoscope Illumination," which are incorporated by reference herein.

The 4D light field data can be processed 120 in various ways to produce a 3D image of the eardrum. Various approaches are described in U.S. application Ser. No. 14/064,090 "Processing of Light Fields by Transforming to Scale and Depth Space," and Ser. No. 15/048,742 "Processing of Light Fields by Transforming to Scale and Depth Space," which are incorporated by reference herein. This particular example uses a LFO to obtain 3D images of the eardrum, but the feature extraction and eardrum classification described below is equally applicable to 3D images acquired by other means.

Registration 130 normalizes the 3D image as defined by a predefined standard form. For example, tilt plane registration can be used to remove tilt (i.e., out-of-plane rotation) of the eardrum image. Rotation registration can be used to compensate for rotation of the eardrum image, where "zero rotation" is defined by the standard form. Center localization detects the center of the eardrum image, where "center" is defined in the standard form, such as the location of the umbo. Scale normalization rescales the eardrum image to a standard size, as defined by the standard form. Note that not all of these steps are required nor are they required to be performed in the order shown. In addition, other registration/normalization processes may also be performed. Additional examples are provided in U.S. patent application Ser. No. 15/452,613 "Automatic Eardrum Registration from Light Field Data," which is incorporated by reference herein.

FIG. 1a shows two approaches to calculating 140 features from the registered 3D image. The lefthand column is a grid-based approach and the righthand column is an isocontour-based approach. In the grid-based approach, a grid is overlaid 141 on the 3D image of the TM. The grid partitions the eardrum image into different cells. One or more descriptors are calculated 142 for the different cells and these descriptors are included 143 in the feature set. In the isocontour-based approach, isocontour lines are calculated 146 for the eardrum image. One or more descriptors are calculated 147 based on the isocontour lines and these descriptors are included 148 in the feature set. These approaches can be used separately or in combination, including with other approaches. They will be described in more detail below.

The feature set is used to classify 150 the eardrum. It may be combined with other information, such as spectral information from an amber or yellow image, which is especially useful to diagnose conditions of the tympanic membrane. Table 1 lists some features distinguishing the conditions of acute otitis media (AOM), otitis media with effusion (OME), and otitis media with no effusion (NOE). Additional examples are described in Ser. No. 14/318,578 "Use of Plenoptic Otoscope Data for Aiding Medical Diagnosis," which is incorporated by reference herein.

TABLE 1

Otoscopic findings associated with clinical diagnostic categories on TM images

|  | AOM | OME | NOE |
| --- | --- | --- | --- |
| Color | White, pale yellow, markedly red | White, amber, gray, blue | Gray, pink |
| Position | Distinctly full, bulging | Neutral, retracted | Neutral, retracted |
| Translucency | Opacified | Opacified, semi-opacified | Translucent |

Depth and Curvature

Before describing specific features, we first describe depth and curvature data for the 3D image of the eardrum. In this example, the input 3D image is obtained by 3D estimation based on the 4D light field data. This can be either a sparse or a dense depth point cloud representation. For a sparse point cloud representation, we can calculate the normalized first derivative Ray-Gaussian light field scale and depth space and/or the Hessian keypoints for the light field scale and depth space, for example as described in U.S. Pat. No. 9,460,515 "Processing of Light Fields by Transforming to Scale and Depth Space" and U.S. Pat. No. 9,569,853 "Processing of Light Fields by Transforming to Scale and Depth Space" (collectively, the "Lisad patents") which are incorporated by reference herein. Lisad stands for light field scale and depth. We thus get a set of points $V \in R^2$ on the eardrum with specific depth. To get the depth graph $J=\{V, E, W\}$, we then connect each point to its neighbors using edges $E$ with corresponding weights $W$. We use Gaussian weights based on either the 3D or 2D distance between the points and we set small ones to zero, resulting in a sparse graph.

For dense depth point cloud representation of 3D eardrum data, we can use the procedure described in the Lisad patents to get a dense depth mesh $M=\{V, O\}$ of the eardrum, where $V$ is the point cloud and $O$ is the mesh connectivity— obtained using Delaunay triangulation, for example. This is the representation that we have used in the following example.

Based on the depth mesh of the eardrum after registration/normalization, which we represent as $M_R=\{V_R, O_R\}$, we can further compute the eardrum curvature. In order to get a smooth curvature estimate, we first re-mesh the points to get a regular grid in two dimensions. The faces of the new mesh are computed through triangulation (e.g., Delaunay) in two dimensions and the depth on the grid locations is interpolated based on the depth of the initial points. Then, to compute the curvature at each point, we start by approximating the neighborhood of each point (up to third order neighbors) with a quadratic surface. Then, the mean and Gaussian curvature of the points are computed based on the eigenvectors of the Hessian of these quadratic approximations. Other curvature computation methods could be used as well.

Grid-Based Features

In this section we describe various grid-based approaches for extracting descriptors and feature sets from the eardrum 3D depth and curvature data, as previously described with respect to steps 141-143 of FIG. 1a.

Grid Construction.

In grid-based approaches, a grid is overlaid onto the 3D image of the eardrum. This is step 141 in FIG. 1a. This partitions the image into cells. The size and shape of the cells depends on the grid. Example grids include the following:

Elliptical grid ($G_E$)
Circular grid with unregistered center ($G_{C1}$)
Circular grid with registered center ($G_{C2}$)

Figure 2B:
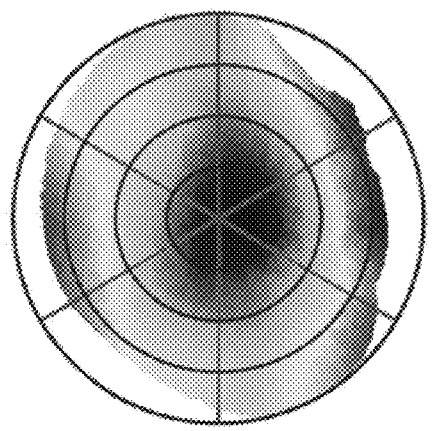
Figure 2A:
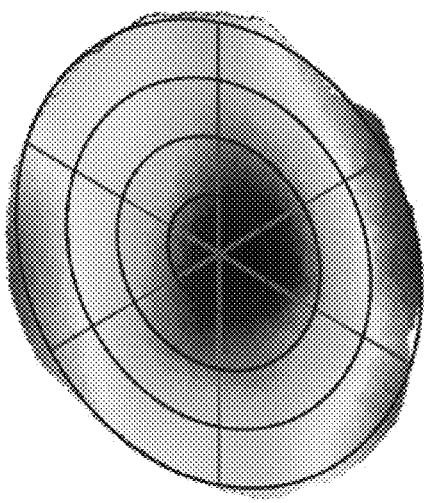

FIGS. 2a-2c illustrate the use of these three grids. In these figures, the color image is the 3D depth image of the eardrum, where warmer colors indicate parts of the eardrum that are higher above the average tilt plane and cooler colors indicate parts of the eardrum that are lower below the tilt plane. The grids are defined by the red radial spokes and the blue polar curves in these examples. In all three cases above, the granularity of the cells is determined by two parameters: the number of angular bins $n_T$ and the number of radial bins $n_R$, which define how many divisions we have in the angular and radial domains, respectively. In FIG. 2, $n_T=6$, $n_R=4$ and the total number of cells is 6×4=24. The grid is preferably selected so that different cells generally cover similar anatomical regions of the eardrum in different images. The cell granularity is preferably chosen so that the cells are large enough to provide good statistical sampling but not so large as to cover anatomical regions with different characteristics. Cell granularity can also be a function of the accuracy of the depth estimation. If the depth estimation is not as accurate, fewer cells are preferred in order to smooth the statistical information extracted per cell. Finer granularity is preferred when a more accurate depth estimation can be obtained.

FIG. 2a is an example of an elliptical grid ($G_E$). To overlay an elliptical grid on the eardrum mesh $M_R$, we first find the boundary points of the vertices $V_R$. Then, we perform a least squares fit to this boundary to recover the center $x_E \in R^2$ as well as the parameters of the major and minor axes of the best fit ellipse. The ellipse is represented in the form:

$$x = x_E + Q(\alpha) \cdot \begin{bmatrix} a\cos(\theta) \\ b\sin(\theta) \end{bmatrix}, \quad (1)$$

where $x_E \in R^2$ is the center of the ellipse, the rotation matrix $$Q(\alpha) = \begin{bmatrix} \cos(\alpha) & -\sin(\alpha) \\ \sin(\alpha) & \cos(\alpha) \end{bmatrix},$$

a and b correspond to the major and minor axes of the ellipse, respectively, and $\theta \in [0, 2\pi)$. This ellipse serves as the outer boundary of the grid, i.e., the border ellipse. Downscaled ellipses are placed co-centrically to create the elliptical grid. The parameters of these ellipses are computed based on the parameters of the border ellipse and the number of radial partitions. In this example, the grid includes $n_T$ angular bins and $n_R$ ellipses with parameters $$\left(x_E, \frac{a \cdot j}{n_R}, \frac{b \cdot j}{n_R}, \alpha\right), j = 1, \ldots, n_R.$$

FIG. 2b is an example of a circular grid with unregistered center ($G_{C1}$). In this example, the center of the grid $x_{C1} \in R^2$ is set equal to the mean coordinates over the vertices $V_R$ and the radius of the border circle, $R_{C1}$, is set equal to the maximum distance of the vertices in $V_R$ from the center $x_{C1}$. To finalize the grid, $n_R-1$ additional circles are placed co-centrically inside the border circle to obtain $n_R$ circles with radii $$\frac{j \cdot R_{C1}}{n_R}, j = 1 \ldots, n_R.$$

FIG. 2c is an example of a circular grid with registered center ($G_{C2}$). In this example, we keep the same shape as for grid $G_{C1}$ but we change the location of the center. Specifically, the center $x_{C2} \in R^2$ is located based on some definition, for example the location of the umbo on the eardrum. An example of how to automatically find the center is provided in U.S. patent application Ser. No. 15/452,613 "Automatic Eardrum Registration from Light Field Data," which is incorporated by reference herein. We set the radius of the border circle, namely $R_{C2}$, equal to the maximum distance of the vertices in $V_R$ from the center $x_{C2}$. To finalize the grid, $n_R-1$ additional circles are placed co-centrically inside the border circle to obtain $n_R$ circles with $$radii \frac{j \cdot R_{C2}}{n_R}, j = 1 \ldots, n_R.$$

The grids described above are just examples. Other variations will be apparent. For example, the border ellipse/circle can be determined by making a best fit to the TM image (as in FIG. 2a), by circumscribing the TM image (as in FIGS. 2b,2c) or by inscribing the TM image. The radial and angular divisions do not have to be evenly spaced. The grid can be designed so that there are smaller size cells in regions of the eardrum with finer structure and larger size cells in regions without finer structure. The grid could be manually defined based on the anatomy of a "reference" eardrum and then scaled to fit actual eardrum images.

Grid-Based Feature Descriptors.

After overlaying the grid on the TM image, we calculate a set of values (descriptors) for the cells in the grid. In the following examples, we use descriptors based on the mean and on the histogram of the eardrum depth and curvature, as described in more detail below.

FIG. 3 is a flow diagram for calculating grid-based descriptors, which is an example of step 142 in FIG. 1a. The main flow 310-330 is used to calculate the descriptors for one cell and the loop repeats 350 the process for all cells. In the main flow, first determine 310 which mesh vertices belong to the grid cell $G_{r,t}$, with $r \in [1, \ldots n_R]$ and $t \in [1, \ldots, n_T]$. For the selected vertices, calculate 320 the mean of their depth and curvature values and store them as $meanD_{r,t} \in \mathbb{R}$ and $meanC_{r,t} \in \mathbb{R}$, respectively. For the selected vertices, also calculate 330 the histogram of their depth and curvature values using $n_B$ histogram bins and store them in $histD_{r,t} \in \mathbb{R}^{n_B \times 1}$ and $histC_{r,t} \in \mathbb{R}^{n_B \times 1}$, respectively. Repeat 350 the previous steps for each of the cells $r=1, \ldots, n_R$ and $t=1, \ldots, n_T$.

The individual descriptors over the different grid cells are concatenated into one vector for each modality as shown below:

$$histD = \begin{bmatrix} histD_{1,1} \\ \vdots \\ histD_{n_R,1} \\ \vdots \\ histD_{n_R,n_T} \end{bmatrix}, meanD = \begin{bmatrix} meanD_{1,1} \\ \vdots \\ meanD_{n_R,1} \\ \vdots \\ meanD_{n_R,n_T} \end{bmatrix} \quad (2)$$

$$histC = \begin{bmatrix} histC_{1,1} \\ \vdots \\ histC_{n_R,1} \\ \vdots \\ histC_{n_R,n_T} \end{bmatrix}, meanC = \begin{bmatrix} meanC_{1,1} \\ \vdots \\ meanC_{n_R,1} \\ \vdots \\ meanC_{n_R,n_T} \end{bmatrix}$$

where histD is the depth histogram descriptor, histC is the curvature histogram descriptor, meanD is the mean depth descriptor and meanC is the mean curvature descriptor. The size of each descriptor depends on the number of cells in the grid, i.e., $n_R \cdot n_T$, as well as the size of the descriptor in each cell which is 1 for the mean descriptors and $n_B$ for the histogram descriptors. Therefore, histD, histC $\in \mathbb{R}^{(n_R \cdot n_T \cdot n_B) \times 1}$ and meanD, meanC $\in \mathbb{R}^{(n_R \cdot n_T) \times 1}$.

Various combinations of descriptors can also be used. The following are three examples of combinations:

$$Combo_1 = \begin{bmatrix} meanD \\ histC \end{bmatrix} \quad (3)$$

$$Combo_2 = \begin{bmatrix} histD \\ meanC \end{bmatrix}$$

$$Combo_3 = \begin{bmatrix} histD \\ histC \end{bmatrix}$$

The $Combo_1$ and $Combo_2$ descriptors combine a mean descriptor with a histogram descriptor and the $Combo_3$ descriptor is composed of purely histogram descriptors.

A summary of different descriptors together with their dimensionality is presented in Table 2. In this table, $n_R$ is the number of grid radial bins and $n_T$ is the number of grid angular bins, and $n_B$ is the number of histogram bins.

TABLE 2

Summary of grid-based descriptors.

| Descr. ID (H) | Descriptor Description | Descriptor Vector Size ($g_H$) |
|---|---|---|
| 1 | meanD: Means of each depth grid cell. | $g_1 \in \mathbb{R}^{(n_R \cdot n_T) \times 1}$. |
| 2 | histD: Histograms of each depth grid cell. | $g_2 \in \mathbb{R}^{(n_R \cdot n_T \cdot n_B) \times 1}$, $g_2 \geq 0$. |
| 3 | meanC: Means of each curvature grid cell. | $g_3 \in \mathbb{R}^{(n_R \cdot n_T) \times 1}$. |
| 4 | histC: Histograms of each curvature grid cell. | $g_4 \in \mathbb{R}^{(n_R \cdot n_T \cdot n_B) \times 1}$, $g_4 \geq 0$. |
| 5 | $Combo_1$: Concatenation of meanD and histC. | $g_5 \in \mathbb{R}^{[n_R \cdot n_T \cdot (1+n_B)] \times 1}$. |
| 6 | $Combo_2$: Concatenation of histD and meanC. | $g_6 \in \mathbb{R}^{[n_R \cdot n_T \cdot (n_B+1)] \times 1}$. |
| 7 | $Combo_3$: Concatenation of histD and histC. | $g_7 \in \mathbb{R}^{[n_R \cdot n_T \cdot 2n_B] \times 1}$, $g_7 \geq 0$. |

In various classification tasks, normalization of descriptors may improve the classifier training process. Two options for normalization include local normalization and global normalization. In local normalization, the histograms in each cell $G_{r,t}$ for $r=1, \ldots, n_R$, $t=1, \ldots, n_T$ are normalized independently of the other cells by dividing by the total number of points in the current cell. That is, the histograms are normalized on a cell-by-cell basis. In this way, each histogram is essentially expressing the percentage of points in the cell that fall into a specific histogram bin. In global normalization, the histograms in all cells are normalized by the total number of points in all of the cells. In this way, the histogram in a specific cell is encoding the percentage of points of the entire TM image that fall into a specific histogram bin for a given cell.

Isocontour-Based Descriptors

In this section we describe various isocontour-based approaches for extracting descriptors and feature sets from the eardrum 3D depth and curvature data, as previously described with respect to steps 146-148 of FIG. 1a.

Isocontour Calculation.

Let us assume that we have a 3D point cloud defined by a set of vertices. Isocontours are the contours at a certain height (certain z value for the third dimension of each vertex). Isocontours can be calculated by resampling the 3D point cloud on a regular grid and using the marching squares algorithm on the resampled mesh. Alternatively, the meandering triangles algorithm can be used directly on the 3D point cloud without resampling, after applying triangulation. Other approaches can also be used.

As a specific example, assume we have a set of 3D points defined by vertices $V=\{v_i\}$ for $i=1, \ldots, N$. Each vertex can be described as a vector $v_i=[x_i, y_i, z_i]^T$. FIG. 4 is a flow diagram for calculating isocontours, which is an example of step 146 and part of step 147 in FIG. 1a. The 3D point cloud representation of the TM image is resampled 410 on a regular grid to obtain a mesh with 2D dimensions w×h, which correspond to width and height, respectively, in pixels. Each value in the mesh is the depth value of the corresponding vertex. Isocontours are constructed 420 from the resampled vertices at D discrete depth levels. For each depth level $d_j$, there may be multiple separate isocontours. Let $P_j$ be the number of isocontours at depth level $d_j$. Eliminate 430 small isocontours using a threshold (thres), for example on the length or area of the isocontour or on the number of points that defines the isocontour. For isocontours that are not closed, close 440 them by using the boundary of the mesh. In one approach, the depth of all points on the boundary segment used to close the isocontour must lie below the depth of the isocontour. If not, that isocontour is left open. Select 450 which isocontours will be used for feature extraction. In one approach, only closed isocontours that enclose the center of the eardrum are used for feature extraction. The number of selected isocontours can depend on the accuracy of depth estimation. If depth estimation is noisy, preferably fewer isocontours are selected. If depth estimation is more accurate, more isocontours can be selected.

Isocontour-Based Feature Descriptors.

After extracting the isocontours from the 3D point cloud, we calculate statistical and geometric descriptors for the isocontours. A summary of the different descriptors together with their dimensionality is presented in Table 3. In this table, with a slight abuse of notation, $N_c$ refers to the number of selected isocontours of the mesh, which is not constant for all eardrum images. In the table, the terms contour and isocontour are used interchangeably.

TABLE 3

Summary of isocontour-based descriptors

| Descr. ID (H) | Descriptor Description | Descriptor Vector Size ($f_H$) |
|---|---|---|
| 1 | Total number of contours. | $f_1 \in \mathbf{Z}, f_1 \geq 0.$ |
| 2 | Total number of unique contour depths. | $f_2 \in \mathbf{Z}, f_2 \geq 0.$ |
| 3 | Total number of closed contours. | $f_3 \in \mathbf{Z}, f_3 \geq 0.$ |
| 4 | Total number of unique contour depths having closed contours. | $f_4 \in \mathbf{Z}, f_4 \geq 0.$ |
| 5 | Is lowest contour closed? | $f_5 \in \{\text{True, False}\}.$ |
| 6 | Level of lowest closed contour | $f_6 \in \mathbf{R}.$ |
| 7 | Mean depth of contours. | $f_7 \in \mathbf{R}.$ |
| 8 | Median depth of contours. | $f_8 \in \mathbf{Z}, f_8 \geq 0.$ |
| 9 | Number of contours above mean depth. | $f_9 \in \mathbf{Z}, f_9 \geq 0.$ |
| 10 | Number of contours above median depth. | $f_{10} \in \mathbf{Z}, f_{10} \geq 0.$ |
| 11 | Number of contours below mean depth. | $f_{11} \in \mathbf{Z}, f_{11} \geq 0.$ |
| 12 | Number of contours below median depth. | $f_{12} \in \mathbf{Z}, f_{12} \geq 0.$ |
| 13 | Number of closed contours above mean depth. | $f_{13} \in \mathbf{Z}, f_{13} \geq 0.$ |
| 14 | Number of closed contours above median depth. | $f_{14} \in \mathbf{Z}, f_{14} \geq 0.$ |
| 15 | Number of closed contours below mean depth. | $f_{15} \in \mathbf{Z}, f_{15} \geq 0.$ |
| 16 | Number of closed contours below median depth. | $f_{16} \in \mathbf{Z}, f_{16} \geq 0.$ |
| 17 | Contour perimeter. | $f_{17} \in \mathbf{R}^{N_c \times 1} f_{17} \geq 0.$ |
| 18 | Contour area. | $f_{18} \in \mathbf{R}^{N_c \times 1} f_{18} \geq 0.$ |
| 19 | Contour eccentricity. | $f_{19} \in \mathbf{R}^{N_c \times 1} f_{19} \geq 0.$ |
| 20 | Contour line waviness. | $f_{20} \in \mathbf{R}^{N_c \times 1} 0 \leq f_{20} \leq 1.$ |
| 21 | Contour area waviness. | $f_{21} \in \mathbf{R}^{N_c \times 1} 0 \leq f_{21} \leq 1.$ |
| 22 | Contour perimeter to mesh boundary perimeter. | $f_{22} \in \mathbf{R}^{N_c \times 1} 0 \leq f_{22}$ |
| 23 | Contour area to mesh area. | $f_{23} \in \mathbf{R}^{N_c \times 1} 0 \leq f_{23} \leq 1.$ |
| 24 | Inscribed circle perimeter to circumscribed circle perimeter. | $f_{24} \in \mathbf{R}^{N_c \times 1} 0 \leq f_{24} \leq 1.$ |
| | For all multidimensional features above (with H $\in$ {17-25}) calculate: | |
| H.a | Mean of non-zero elements. | $f_{H.a} \in \mathbf{R}.$ |
| H.b | Mean difference of subsequent non-zero elements. | $f_{H.b} \in \mathbf{R}.$ |
| H.c | Median of non-zero elements. | $f_{H.c} \in \mathbf{R}.$ |
| H.d | Slope (rate of change) of the line that best fits the non-zero elements. | $f_{H.d} \in \mathbf{R}.$ |

Figure 5A:
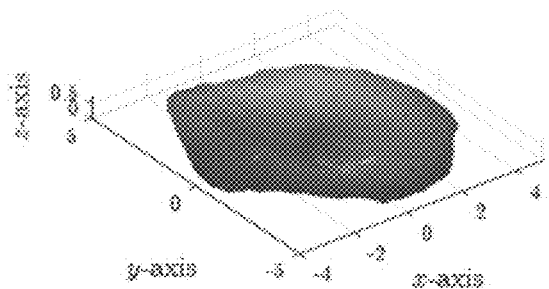
FIGS. 5a-5f are images illustrating the method of FIG. 4.
Figure 5B:
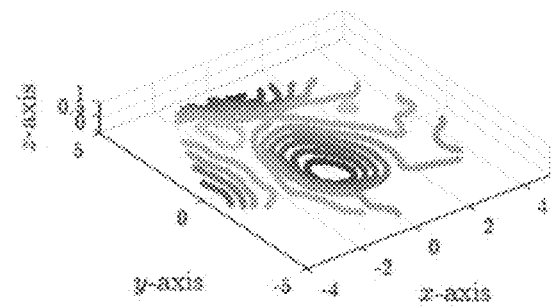
Figure 5C:
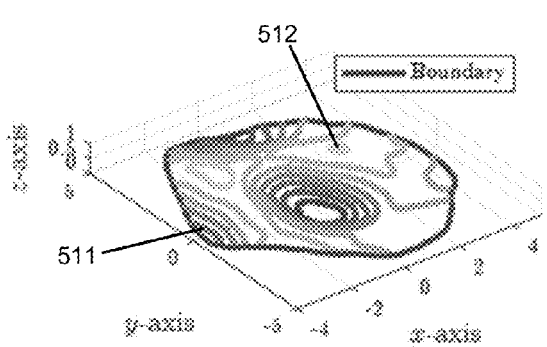
Figure 5D:
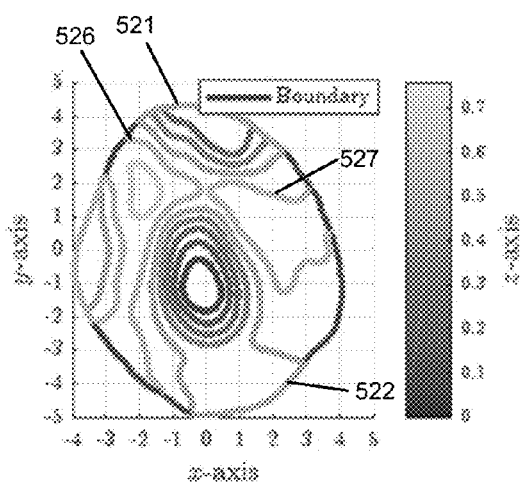
Figure 5E:
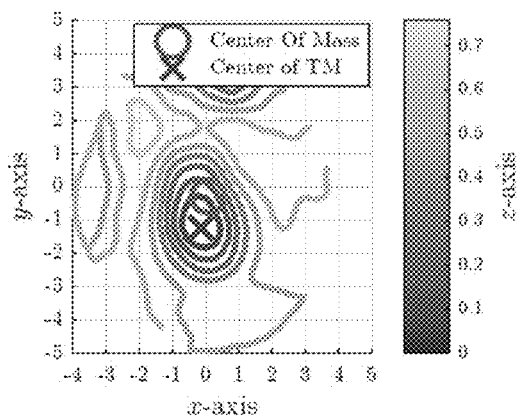
Figure 5F:
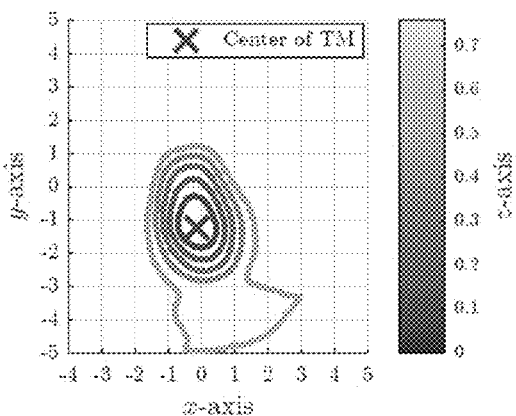

Listing A at the end of the detailed description contains pseudo-code implementing the method described above, and FIGS. 5a-5f are images illustrating the method described above. FIG. 5a shows the 3D TM image, which is resampled 410 on a regular x-y grid. FIG. 5b shows the raw isocontours extracted 420 from the depth image. Warmer colors are at higher depth values and cooler colors are at lower depth values. FIG. 5c shows the mesh boundary in red. In FIG. 5d, small contours such as 511, 512 in FIG. 5c have been eliminated 430. In addition, open contours lying above the boundary are closed 440. In FIG. 5d, open isocontours 521, 522 have been closed using the boundary. In contrast, isocontours 526, 527 remain open because the boundary does not lie below the isocontour. FIG. 5e shows only the closed isocontours and also shows two possible centers, one based on the center of mass and one based on an anatomical center of the TM. In this example, the anatomical center is selected as the center. FIG. 5f shows only those isocontours that enclose the center. These are the isocontours that are used to calculate the isocontour-based descriptors.

Table 3 lists a total of 56 isocontour-based descriptors. The statistical descriptors (1-16) as well as some of the geometric descriptors (17-18) and their accumulated descriptors (H.a-H.d) are self-evident from the descriptions in the table. For the remaining descriptors (19-24), we provide explanations below:

Contour eccentricity (19): For each closed isocontour, we make a best fit of an ellipse to the isocontour. The ellipse has principal axes with lengths a and b and the eccentricity of the ellipse is calculated as the ratio a/b. If the ellipse is close to a circle, the eccentricity will be close to 1. Otherwise, it will take values deviating from 1.

Contour line waviness (20): For each closed isocontour, we calculate the smallest convex shape that circumscribes the isocontour and then find the ratio of the perimeter of this convex hull to the perimeter of the isocontour. This provides a measure of how wavy each isocontour is, with isocontours that have less concavity and less waviness having values close to 1 while those with more concavity and more waviness have values smaller than 1.

Contour area waviness (21): Similar to the line waviness (20) above, the area waviness for a closed isocontour is defined as the ratio of the area of its convex hull to the area of the isocontour. Since area increases quadratically, we actually calculate the square root of this ratio giving rise to values that lie between 0 and 1.

Contour perimeter to mesh boundary perimeter (22): For each closed isocontour we calculate the ratio of its perimeter to the perimeter of the boundary of the mesh, giving rise to values that are usually between 0 and 1. This gives an indication of the size of the isocontour compared to the size of the whole mesh described by the input vertices.

Contour area to mesh area (23): Similar to the aforementioned ratio of perimeters (22), we calculate the ratio between the area of each closed isocontour to the area of the whole mesh. Since area increases quadratically, we actually calculate the square root of this ratio, giving rise to values that lie between 0 and 1.

Inscribed circle perimeter to circumscribed circle perimeter (24): For each closed isocontour we find the largest inscribed circle (i.e., the largest circle that fits entirely within the isocontour) and the smallest circumscribed circle (i.e., the smallest circle that encloses the entire isocontour), and calculate the ratio of their perimeters, giving rise to values between 0 and 1. This measure provides a shape factor for the isocontour (e.g., how closely it resembles a circle), with values closer to 1 indicating a more circle-like and less jaggy isocontour.

The multidimensional descriptors (16-24) are calculated for the $N_c$ selected closed isocontours found on the current mesh. If no closed isocontours are found, the corresponding values are set to 0. If there are non-zero values, then descriptors (H.a-H.d) are calculated for the sequence of $N_c$ closed isocontours found on each mesh.

Ordering of Feature Descriptors.

As mentioned earlier, the multidimensional isocontour feature descriptors presented in Table 3 have been denoted as having dimensions $N_c \times 1$. However, this $N_c$ is not a constant but is the number of selected closed isocontours on each mesh (i.e., for each image), which can be different for different meshes. In order to use these multidimensional descriptors to train a classifier, the dimensions preferably should be the same across different meshes. In one approach, the descriptors are ordered to meet this constraint.

In priority ordering, we find the largest value of $N_c$ in the training set (i.e., the training sample that has the largest number of selected isocontours), which we denote as $N_{c,max}$. Then all multidimensional descriptors are converted to dimensions $N_{c,max} \times 1$ using zero padding. For example, if for a mesh we have values $\{u_1, u_2, u_3\}$ for a multidimensional descriptor and $N_{c,max}$ is 5, we convert it to $\{u_1, u_2, u_3, 0, 0\}$.

In depth order, we use the depth levels $\{d_1, \ldots d_D\}$ to construct each descriptor vector. For example, if for a mesh we have values $\{u_1, u_2, u_3\}$ at depth levels $\{d_2, d_5, d_D\}$ for a multidimensional feature, we convert it to $\{0, u_1, 0, 0, u_2, 0, \ldots, 0, u_3\}$. Hence all multidimensional descriptors have dimensions $D \times 1$.

Example Results

We have run experiments for all of the descriptors listed above. In these experiments, we use a database of images of human eardrums captured by a light field otoscope. There are approximately 350 samples, for which we have ground truth labels. Specifically, eardrums have been characterized as exhibiting Bulging, being Neutral or exhibiting Retraction. We considered two different types of two-class classification problems. First, we classify Bulging vs No-Bulging (i.e., Neutral or Retraction). Second, we classify Retraction vs No-Retraction (i.e., Neutral or Bulging).

We have used two classifiers, namely a neural network (NN) classifier with one hidden layer and Support Vector Machines (SVMs). However, different classifiers could be employed as well.

Grid-Based Feature Descriptors.

In the experiments for the grid-based descriptors, we focused mainly on two values for the number of angular bins $n_T=6$ and $n_T=1$. The number of radial bins was set to $n_R=4$. We also used different types of feature normalization.

We would like the size of the descriptors to stay as low as possible. Therefore, we would like to use as few bins ($n_B$) as possible in the histograms without penalizing the performance of the descriptors. We normalized the depth and curvature values to [−1, 1]. Within this range, most of the values are concentrated in the range [−0.3, 0.3]. Therefore, we compress the values outside this range and provide finer resolution within this range. In one approach, we use $n_B=8$ bins per histogram with the following edge values: [−1, −0.3, −0.2, −0.1, 0, 0.1, 0.2, 0.3, 1].

In our experiments, we observe that with $n_T=6$ for the number of angular bins of the grids we get generally better results than with $n_T=1$. As far as the normalization of the histogram descriptors is concerned, most of the time global normalization seems to work better than local normalization, especially when $n_T=6$. The elliptical grid generally seems to yield better classification results than the circular grids. Of the individual experiments, mean curvature using an elliptical grid generally produced the best results.

Isocontour-Based Feature Descriptors.

We have calculated all of the isocontour-based descriptors listed in Table 3 for our sample images and then classify the sample images based on their descriptors. In one approach, we want to identify isocontour feature descriptors that are discriminative for each type of classification problem. For that purpose, we use an algorithm that greedily tests all isocontour descriptors and ranks them in decreasing order of importance for the classification problem at hand.

FIG. 6 is a flow diagram for selecting isocontour-based descriptors, according to one embodiment. This is an example implementation of step 148 in FIG. 1a. Each isocontour descriptor is individually evaluated and ranked 610 with respect to their ability to discriminate. That is, the descriptors that provide the highest classification accuracy are ranked the highest. Initialize 620 a feature set with only the highest ranked descriptor, and determine its classification accuracy. Then add 630 the next highest ranked descriptor to the feature set and determine the classification accuracy for the new feature set. If the classification accuracy improves 640, then keep 642 the newly added descriptor as part of the feature set. Otherwise, discard 644 it. Repeat 650 until all descriptors have been considered. Listing B at the end of the detailed description contains pseudo-code implementing this method.

Table 4 shows the results of this prioritization of isocontour-based descriptors. Each column in Table 4 lists a difference scenario. The first column lists results for the classification task of Bulging vs No-Bulging, where the samples are zero-padded to the same size using the priority ordering approach described above. In that case, descriptor (5) was the most discriminating and was used to initialize the feature set. The descriptor IDs are as defined previously in Table 3. That is, descriptor (5) is "Is lowest contour closed?" Descriptor (6) was added next, and so on. The final feature set included a total of 16 descriptors. The second column lists results for the same task Bulging vs No-Bulging, but using depth ordering. Descriptor (4) was the most discriminating. Descriptor (5) was added next, and so on. This resulted in a feature set with 23 descriptors. The third and fourth columns show analogous results, but for the classification task Retraction vs No-Retraction. Note that a fair number of the more discriminating descriptors are fairly simple descriptors, such as one-dimensional descriptors that can be calculated fairly efficiently.

TABLE 4

Feature sets using isocontour-based descriptors

| Bulging vs No-Bulging | | Retraction vs No-Retraction | |
|---|---|---|---|
| Priority Ordering | Depth Ordering | Priority Ordering | Depth Ordering |
| 5 | 4 | 5 | 2 |
| 6 | 5 | 6 | 14 |
| 13 | 6 | 9 | 17.[d] |
| 14 | 7 | 11 | 18.[a, d] |
| 20.[a, b, c, d] | 8 | 12 | 19.[b] |
| 21 | 11 | 13 | 20.[a] |
| 21.[a, b, c] | 12 | 14 | 21.[c] |
| 24 | 13 | 18 | 22.[a, d] |
| 24.[a, b, c] | 14 | 20.[a, b] | 23 |
| — | 17.[b] | 21 | 23.[c] |
| — | 19.[b] | 21.[a, b] | 24.[b] |
| — | 20.[a, b, c, d] | 24.[c] | — |
| — | 21.[b, c] | — | — |
| — | 22.[b] | — | — |
| — | 23.[a, c] | — | — |
| — | 24.[a, b, c] | — | — |
| 16 selected descriptors | 23 selected descriptors | 14 selected descriptors | 13 selected descriptors |

Additional Considerations

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the detailed description contains many specifics, these should not be construed as limiting the scope of the invention but merely as illustrating different examples and aspects of the invention. It should be appreciated that the scope of the invention includes other embodiments not discussed in detail above. For example, classifications can be based on a combination of grid-based features and isocontour-based features, and/or in combination with other techniques. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

Listing A: Pseudo-code for calculating isocontours from a 3D point cloud

1: Inputs: N vertices $v_i = [x_i, y_i, z_i]^T$ for $i = 1, \ldots, N$ describing a 3D point cloud; $w \times h$ describing the dimensions of a grid (width, height respectively) in pixels; Set of D depth levels $\{d_1, \ldots, d_D\}$ with $d_j \in \mathbb{R}$ for $j = 1, \ldots, D$; a threshold thres.
2: Calculate coordinate limits as:
3:     $i_{x,min} \leftarrow \mathrm{argmin}\, x_i \Rightarrow x_{min} \leftarrow \lfloor x_{i_x,min} \rfloor$, $i_{y,min} \leftarrow \mathrm{argmin}\, y_i \Rightarrow y_{min} = \lfloor y_{i_y,min} \rfloor$
4:     $i_{x,max} \leftarrow \mathrm{argmax}\, x_i \Rightarrow x_{max} \leftarrow \lceil x_{i_x,max} \rceil$, $i_{y,max} \leftarrow \mathrm{argmax}\, y_i \Rightarrow y_{max} \leftarrow \lceil y_{i_y,max} \rceil$
    where argmin and argmax are over the index i
5: Resample vertices on a regular 2D grid of dimensions $w \times h$ at equally spaced intervals over the ranges $[x_{min}, x_{max}]$, $[y_{min}, y_{max}]$ using interpolation. Obtain new set of vertices of a mesh $\tilde{v}_i = [\tilde{x}_i, \tilde{y}_i, \tilde{z}_i]^T$ for $i = 1, \ldots, w \cdot h$ with possible undefined values.
6: Find mesh center: Determine $\{\tilde{x}_{center}, \tilde{y}_{center}\}$.
7: Find mesh boundary: Determine set of vertices $b_i = [\tilde{x}_i, \tilde{y}_i, \tilde{z}_i]^T$ for $i = 1, \ldots, B, 0 < B < w \cdot h$) that belong to the boundary of the mesh.
8: for $j \leftarrow 1, \ldots, D$ do:
9:     Find $P_j \geq 0$ disconnected isocontours $C_{j,p}, p = 1, \ldots, P_j$ containing information:
10:         $C_{j,p}.\tilde{X} \leftarrow$ Set of $\tilde{x}$ coordinates.
11:         $C_{j,p}.\tilde{Y} \leftarrow$ Set of $\tilde{y}$ coordinates.
12:         $C_{j,p}.\mathrm{isopen} \leftarrow$ True if first and last values in $C_{j,p}.\tilde{X}$ and $C_{j,p}.\tilde{Y}$ are different.
13:         $C_{j,p}.\mathrm{flag} \leftarrow$ False.
14:     if $|C_{j,p}.\tilde{X}| <$ thres then
15:         Erase isocontour $C_{j,p}$ and continue to the next isocontour.
16:     end if
17:     if $C_{j,p}.\mathrm{isopen}$ then

| Listing A: Pseudo-code for calculating isocontours from a 3D point cloud |
| --- |
| 18:     Close isocontour by connecting its points with boundary points $b_i$, in clockwise or counterclockwise order, selecting the boundary segment with the smallest length. |
| 19:     if $d_j$ is smaller than depth of all points of the selected boundary segment then |
| 20:         $C_{j,p}$.isopen ← False |
| 21:         Update coordinates $C_{j,p}.\tilde{X}, C_{j,p}.\tilde{Y}$, appropriately including boundary. |
| 22:     end if |
| 23:     if $\{\tilde{x}_{center}, \tilde{y}_{center}\}$ is inside the 2D polygon defined by $\{C_{j,p}.\tilde{X}, C_{j,p}.\tilde{Y}\}$ then |
| 24:         $C_{j,p}$.flag ← True |
| 25:     end if |
| 26:   end if |
| 27: end for |
| 28: Outputs: Set of isocontours $CC_{j,p}$, for j=1, ..., L and p = 1, ..., $P_j$, $N_c$ of which are flagged as selected (i.e. $C_{j,p}$.flag = True). |

| Listing B: Pseudo-code for calculating feature set of isocontour-based descriptors |
| --- |
| 1:   Inputs: Feature descriptor database $F_D$; Set of descriptor IDs $F_N = \{F_{N,1}, ..., F_{N,F}\}$ corresponding to the database $F_D$ (see Table 3); Training ($T_l$) and testing ($Q_l$) (or validation $K_l$) sets for L database partitions with l = 1, ..., L, for a classification problem with C classes. |
| 2:   if $K_l \neq \{\}$ then |
| 3:       $Q_l \leftarrow K_l$. |
| 4:   end if |
| 5:   currentF ← { }. |
| 6:   selectedF ← { }. |
| 7:   f ← 1. |
| 8:   while $F_N \neq \{\}$ do: |
| 9:       selectedF ← currentF ∪ $F_{N,f}$. |
| 10:      for l ← 1, ..., L do: |
| 11:          Train classifier for C classes using the training partition $T_l$ and the selected feature descriptors, whose IDs appear in selectedF, from the feature database $F_D$. |
| 12:          Test the trained classifier using the testing (or validation) partition $Q_l$ and the selected feature descriptors, whose IDs appear in selectedF, from the feature database $F_D$. |
| 13:          Store classification accuracies $A_{f,l}$. |
| 14:      end for |
| 15:      $A_{f,mean} \leftarrow \Sigma_{l=1}^{L}(A_{f,l})/L$ |
| 16:      $l_{min} \leftarrow \text{argmin } A_{f,l} \Rightarrow A_{f,min} \leftarrow A_{f,lmin}$. |
| 17:      $l_{max} \leftarrow \text{argmax } A_{f,l} \Rightarrow A_{f,max} \leftarrow A_{f,lmax}$. |
| 18:      if f = $|F_N|$ then |
| 19:          f ← argmax ($A_{f,mean} + A_{f,max} + A_{f,min}$). |
| 20:          $F_N \leftarrow F_N \setminus \{F_{N,f}\}$, (i.e., remove $F_{N,f}$ from set $F_N$). |
| 21:          currentF ← currentF ∪ $\{F_{N,f}\}$. |
| 22:          f ← 1. |
| 23:      else |
| 24:          f ← f + 1. |
| 25:      end if |
| 26:  end while |
| 27:  Outputs: Featured IDs selectedF in decreasing order in terms of importance for performing classification on C classes. |

What is claimed is:

1. A method for automatic classification of eardrum shape from a three-dimensional image of an eardrum, the method performed by a computer system having a processor and memory, the method comprising:
   calculating a feature set for the eardrum based on the three-dimensional image of the eardrum, wherein calculating the feature set comprises:
      overlaying a two-dimensional grid onto the three-dimensional image of the eardrum by extending the two-dimensional grid along a depth dimension, thereby partitioning the three-dimensional image into cells; and
      calculating one or more descriptors for each of the cells, the feature set comprising the calculated descriptors; and
   classifying a three-dimensional shape of the eardrum based on the feature set.

2. The method of claim 1 wherein the two-dimensional grid is one of an elliptical grid, a circular grid with an unregistered center and a circular grid with a registered center.

3. The method of claim 1 wherein at least one of the descriptors is based on the eardrum depth values within each cell.

4. The method of claim 1 wherein at least one of the descriptors is based on the eardrum curvatures within each cell.

5. A method for automatic classification of eardrum shape from a three-dimensional image of an eardrum, the method performed by a computer system having a processor and memory, the method comprising:

calculating a feature set for the eardrum based on the three-dimensional image of the eardrum, wherein calculating the feature set comprises:
  calculating isocontour lines for the three-dimensional image of the eardrum; and
  calculating one or more descriptors for the isocontour lines, the feature set comprising the calculated descriptors; and
classifying a three-dimensional shape of the eardrum based on the feature set.

6. The method of claim 5 wherein the descriptors are not calculated for isocontour lines that have a length below a threshold.

7. The method of claim 5 further comprising: for isocontour lines that are open and end at a boundary of the three-dimensional image, closing the isocontour line.

8. The method of claim 5 wherein the descriptors are calculated only for closed isocontour lines that enclose a center of the eardrum.

9. The method of claim 5 wherein at least one of the descriptors is based on the number of isocontour lines.

10. The method of claim 5 wherein at least one of the descriptors is based on a depth of the isocontour lines.

11. The method of claim 5 wherein at least one of the descriptors is based on a length of the isocontour lines, on an area enclosed by the isocontour lines, or on a shape of the isocontour lines.

12. The method of claim 1 wherein at least some of the descriptors are calculated based on values for the three-dimensional image of the eardrum, and at least one of the descriptors is calculated based on a statistical average of values.

13. The method of claim 1 wherein at least some of the descriptors are calculated based on values for the three-dimensional image of the eardrum, and at least one of the descriptors comprises a histogram of values.

14. The method of claim 1 wherein classifying the three-dimensional shape of the eardrum distinguishes between a bulging eardrum and a not bulging eardrum.

15. The method of claim 1 wherein classifying the three-dimensional shape of the eardrum distinguishes between a retracted eardrum and a not retracted eardrum.

16. The method of claim 1 wherein classifying the three-dimensional shape of the eardrum distinguishes between acute otitis media (AOM), otitis media with effusion (OME) and no effusion (NOE).

17. The method of claim 1 wherein the three-dimensional image of the eardrum is a registered three-dimensional image of the eardrum, wherein registration compensates for out-of-plane rotation, in-plane rotation and center localization.

18. A non-transitory computer-readable storage medium storing executable computer program instructions for automatic classification of eardrum shape from a three-dimensional image of an eardrum, the instructions executable by a processor and causing the processor to perform a method comprising:
  calculating a feature set for the eardrum based on the three-dimensional image of the eardrum, wherein calculating the feature set comprises:
    overlaying a two-dimensional grid onto the three-dimensional image of the eardrum by extending the two-dimensional grid along a depth dimension, thereby partitioning the three-dimensional image into cells; and
    calculating one or more descriptors for each of the cells, the feature set comprising the calculated descriptors; and
  classifying a three-dimensional shape of the eardrum based on the feature set.

19. The method of claim 5 wherein classifying the three-dimensional shape of the eardrum distinguishes between a bulging eardrum and a not bulging eardrum.

20. The method of claim 5 wherein classifying the three-dimensional shape of the eardrum distinguishes between a retracted eardrum and a not retracted eardrum.

* * * * *